United States Patent [19]

Morris et al.

[11] Patent Number: 4,835,786
[45] Date of Patent: * May 30, 1989

[54] UNITARY SOLID-STATE LASER

[75] Inventors: Robert C. Morris, Ledgewood, N.J.; Norman G. Schroeder, Timonium, Md.; Jerry W. Kuper, Martinsville, N.J.; Michael L. Shand, Morristown, N.J.; Joseph J. Barrett, Morris Plains, N.J.

[73] Assignee: Allied-Signal Inc., Morris Township, Morris County, N.J.

[ * ] Notice: The portion of the term of this patent subsequent to Mar. 29, 2005 has been disclaimed.

[21] Appl. No.: 62,940

[22] Filed: Jun. 16, 1987

Related U.S. Application Data

[63] Continuation-in-part of Ser. No. 809,606, Dec. 16, 1985, Pat. No. 4,734,913.

[51] Int. Cl.$^4$ ............................................. H01S 3/093
[52] U.S. Cl. ...................................... 372/72; 372/34; 372/35
[58] Field of Search ............................ 372/72, 34–36, 372/69, 70

[56] References Cited

U.S. PATENT DOCUMENTS

| | | | |
|---|---|---|---|
| 3,500,238 | 3/1970 | Bazinet, Jr. et al. | 372/34 |
| 3,528,030 | 9/1970 | Bicket et al. | 372/72 |
| 3,626,319 | 12/1971 | Gilbert | 372/34 |
| 3,805,186 | 4/1974 | Woodcock | 372/34 |
| 4,429,394 | 1/1984 | Guch, Jr. | 372/34 |
| 4,601,038 | 7/1986 | Guch, Jr. | 372/34 |
| 4,637,028 | 1/1987 | Kahan | 372/34 |
| 4,734,913 | 3/1988 | Morris et al. | 372/34 |

Primary Examiner—William L. Sikes
Assistant Examiner—B. Randolph Holloway
Attorney, Agent, or Firm—Gerhard H. Fuchs; Richard C. Stewart

[57] ABSTRACT

A simple, compact, and rugged laser comprises a solid transparent housing with two cavities. A laser medium is embedded in one cavity and a pump lamp in the other. By choosing for the housing and lamp envelope materials having thermal expansion coefficient similar to that of the laser medium, high power operation is feasible. An optional reflecting coating on the exterior of the housing enhances efficiency. A filter coating on the lamp envelope eliminates unwanted components of lamp radiation.

7 Claims, 8 Drawing Sheets

UV-IR Coated flashlamp reduces unwanted pump radiation in the ultraviolet and infrared spectral regions and provides a ~17% increase in 400-700 nm spectral band output energy.

UNITARY SOLID-STATE LASER

CROSS-REFERENCE TO RELATED APPLICATIONS

This application is a continuation-in-part of application Ser. No. 809,606, now U.S. Pat. No. 4,734,913, which was filed Dec. 16, 1985, and whose disclosure is specifically incorporated by reference herein.

BACKGROUND OF THE INVENTION

1. Field of the Invention

This invention relates to an optically-pumped solid-state laser whose laser medium and pump lamp are both embedded in a transparent solid housing.

2. Description of the Prior Art

For many solid-state laser applications, a simple, compact, and rugged structure is desirable or even essential. In general, such a structure cannot be achieved if it is necessary to cool the laser medium with flowing gas or liquid. To avoid the need for fluid cooling, lasers using conduction cooling have been disclosed.

Radecki et al., in U.S. Pat. No. 4,170,763, disclose a conductively cooled laser pumping assembly in which the laser rod is supported by clamps that connect the ends of the rod to a heat conductive body.

Guch, in U.S. Pat. No. 4,429,394, discloses a conduction cooled solid-state laser that has a gap between a laser crystal and pump lamp mounted in a solid housing.

SUMMARY OF THE INVENTION

In accordance with the present invention, a unitary laser comprises:

(a) a transparent, thermally-conductive solid housing, the housing comprising two semicylindrical sections joined at one surface to be movable between a first open position and a second closed position;

(b) a laser medium that has two opposite ends and is embedded in a first cavity in the housing which is defined by the housing, when the housing is in the second closed position;

(c) a pump lamp for exciting the laser medium that is embedded in a second cavity in the housing, and (d) reflectors adjacent to the opposite ends of the laser medium that define an optical resonant cavity and support coherent radiation laser emitted by the laser medium. Preferably, the laser medium is alexandrite or emerald. Of course, the arrangement can be made suitable for other solid state laser materials. In some specific applications, this arrangement would be desirable for use with Nd:YAG. Other materials with which the invention could be practiced include $Cr:ScBO_3$, $Cr:Gd_3Sc_2Ga_3O_{12}$, $Ti:BeAl_2O_4$, $Nd:Cr:Gd_3Sc_2Ga_3O_{12}$, $Cr:SrAlF_5$ and $Cr:KZnF_3$. The housing and lamp envelope are preferably sapphire.

In accordance with another variant of the invention, the unitary laser comprises:

(a) a transparent, thermally conductive solid housing;

(b) a laser medium that has two opposite ends and is embedded in a first cavity in the housing;

(c) a pump lamp for exciting the laser medium that is embedded in a second cavity in the housing;

(d) a filter coating on said pump lamp and extending around the pump lamp for eliminating unwanted components of the lamp output than do not efficiently excite the laser medium; and (e) reflectors adjacent to the opposite ends of the laser medium that define an optical resonant cavity and support coherent radiation emitted by the laser medium.

In accordance with yet still another aspect, the invention involves a combination of the features of the two above-discussed variants.

The laser medium may have any suitable shape; e.g., rod, slab, etc. For convenience, we refer to the medium as a "rod." Because the laser rod and pump lamp are embedded in the housing, the laser of the present invention is simple, compact and rugged. By "embedded" we mean that the rod and lamp are substantially surrounded by the housing on all sides, except possibly for the ends.

BRIEF DESCRIPTION OF THE DRAWINGS

FIG. 7 is an end cross-sectional view of a flashlamp of the type employed in the practice of the invention;

FIG. 12 shows output with alexandrite rods after having been solarized for both coated and uncoated lamps.

DETAILED DESCRIPTION OF THE INVENTION

The present invention provides a solid-state laser that has a unitary structure; i.e., the elements of the pump chamber—laser medium, pump lamp, and optical resonator—are a unit. As a result of the unitary structure, the laser is simple, compact, and rugged.

Figure 1:
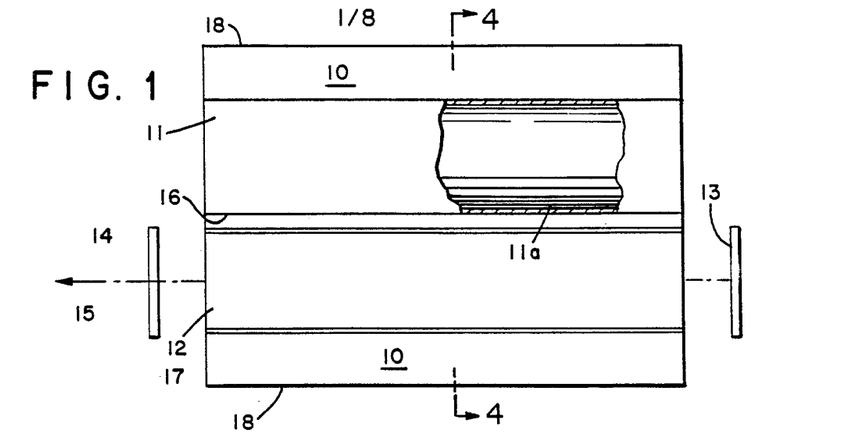
FIG. 1 is a diagramatic illustration in partial cross section of a laser apparatus of the present invention.

The construction of the pump chamber is shown schematically in FIG. 1. Embedded in transparent housing 10 is pump lamp 11 and laser rod 12. Total reflector 13 and partial reflector 14 are positioned along the axis of laser medium 12. Lasing action is evidenced by the emission of coherent radiation 15. Note that FIG. 1 depicts a separate envelope structure 11a for lamp 11; however, housing 10 may serve as the lamp envelope. Depending on the emission characteristics of the pump lamp, and the absorption characteristics of the laser rod, it may be advantageous that the pump lamp envelope 11a have a filter coating 16, to eliminate unwanted spectral components of the lamp output. A suitably chosen coating, as will be discussed hereinafter, 16 will reflect back into the lamp those wavelengths (infrared and ultraviolet, for example) that do not efficiently excite the laser rod. This reflection back into the lamp further excites output at the desired wavelengths. Furthermore, elimination of the ultraviolet component can prevent solarization of the laser rod. Greater efficiency can often be achieved by having an optional reflective coating or reflective element 18 around housing 10. Silver, of course, is a good reflecting material.

The coating 16 around the flashlamp is preferably a dielectric coating which has been deposited thereon. As previously noted, preferably, the coating has a high reflectivity in the infrared and ultraviolet and is highly transmissive in the 400–700 nm spectral region. As a result of using this type of coating, specific wavelength radiation of the type which can lead to laser rod solarization is blocked. Further, the blocked or reflected radiation is recycled back into the flashlamp to increase its efficiency and output in the spectral regions which are more closely matched to the broad absorption bands of the laser medium, in this case, preferably, alexandrite; although as will be discussed hereinafter, improvement is also achieved with specific other laser materials. In addition, the fact that the coating is directly on the flashlamp and negligible dimension in thickness, allows for tighter geometries of the rod and lamp. This is opposed to a filter coating which relies on absorption through a suitable thickness and spacing of doped material.

Figure 6:
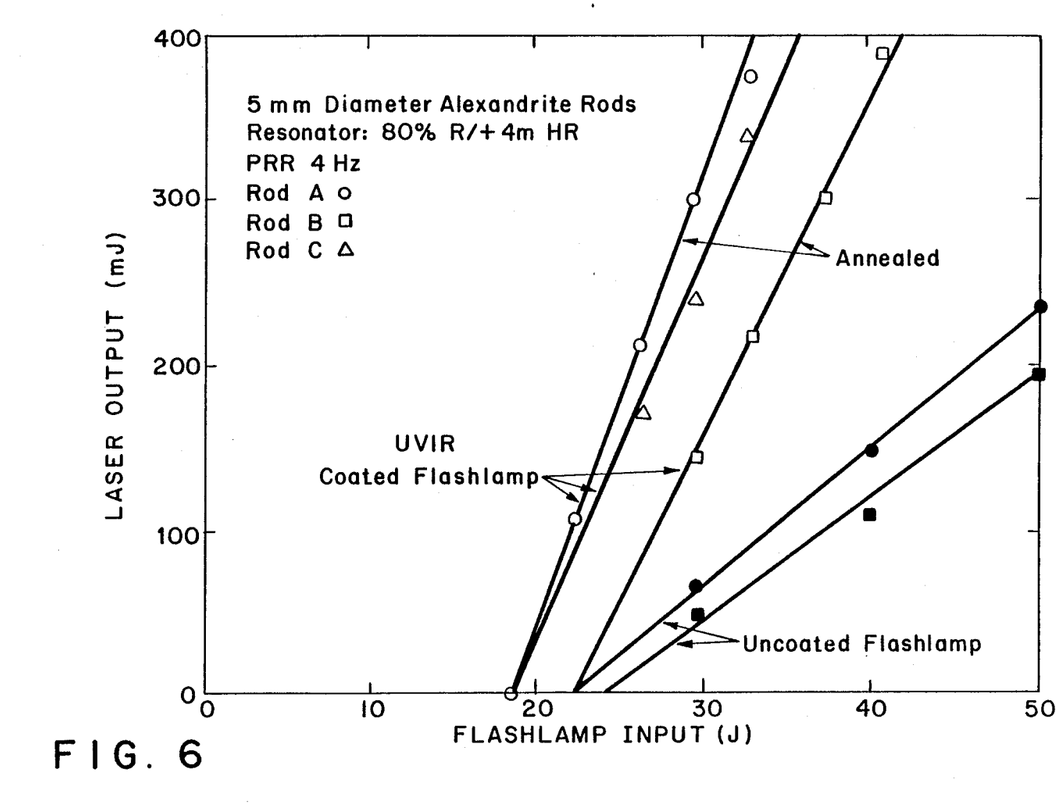
FIG. 6 is a graph illustrating, comparatively, the performance achieved with a coated flashlamp in the invention as compared to an uncoated flashlamp.

FIG. 6 comparatively illustrates the performance improvement achieved by using a coated flashlamp in accordance with the invention as compared to uncoated lamps. More specifically, long pulse laser output achieved using an uncoated flashlamp is shown for two 5 mm alexandrite laser rods A and B. As shown therein, the uncoated flashlamp rods show decreased efficiency caused by rod solarization and poor overlap of the output of the flashlamp with rod absorption bands.

Thereafter, the same two rods were annealed for 15 minutes rod A at 700° C. to correct for solarization, i.e., to eliminate color centers. Rod B was annealed for 15 minutes at 600° C. They were then both operated in an identical long pulse resonator using a coated flashlamp. As shown, the performance of rod A is nearly identical to that of rod C which was only operated with a coated flashlamp. The performance of rod B is somewhat less, possibly caused by incomplete removal of color centers upon annealing at the lower temperature. The enhanced performance observed for rods A and C with the coated flashlamp remained constant for more than $5 \times 10^6$ pulses. It is expected that full lifetime of the coated flashlamps of greater than $10^8$ shots, which is comparable to full lifetime of uncoated flashlamps, should be achieved.

FIG. 7 shows an end cross-sectional view of a typical flashlamp employed in the practice of the present invention illustrating schematically the operation thereof.

Typically, the coating on the flashlamp is deposited by vacuum evaporation in a multilayer, e.g., 35–75 layers, manner on the lamp. The preferred coatings are of oxide dielectric coating material such as $SiO_2$, $Ta_2O_5$ and other equivalents as will be readily apparent to those of ordinary skill in this art. As a result of coating a flashlamp in the manner discussed above, the following results are achieved in reflectance and transmission of light.

Reflectance >90% at 230–400 nm
Reflectance >85% at 1000–1500 nm
Transmittance >95% in pass band, i.e., about 400–700 nm Flashlamps having coatings as discussed are presently commercially available from, e.g., OCLI, and when used in combination with the other features of the present invention result in unexpectedly improved performance, especially in the case of alexandrite, as well as, emerald lasers.

As shown in FIG. 7, the lamp consists of a quartz envelope 101 having a multilayer dielectric coating 103. Reflected radiation 105 in the 230–400 nm and 1000–1500 nm range is recycled back into the plasma 107 and re-emitted as higher levels of transmitted radiation 109 in the 400–700 nm range.

Figure 8:
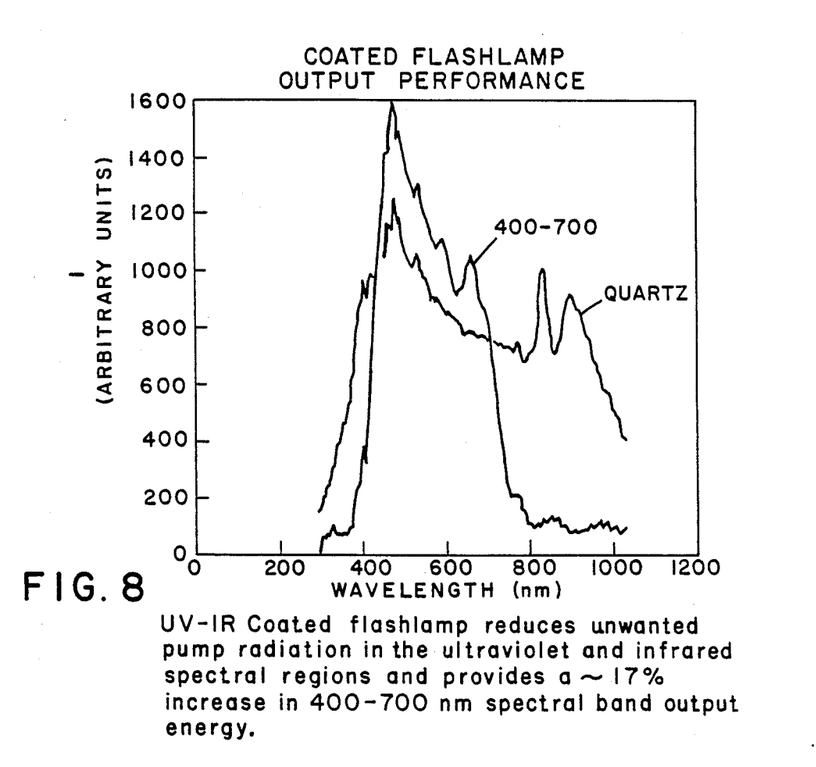
FIG. 8 is a graph comparing output of a coated flashlamp with one having no coating.

FIG. 8 shows comparatively the output achieved with a coated quartz flashlamp as compared with an uncoated quartz flashlamp. The effects of the coatings in the different wavelength ranges is clearly shown.

Figure 9:
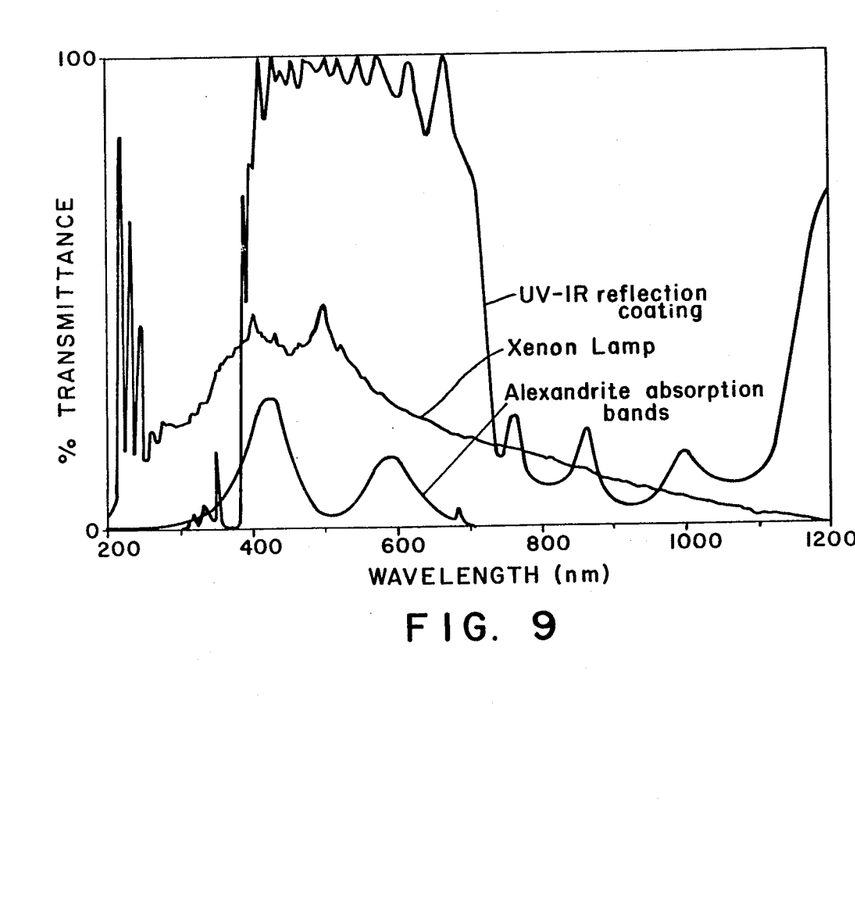
FIGS. 9 and 10 show output correlation of coated lamps with rod absorption bands respectively for alexandrite and Nd:YAG.
Figure 10:
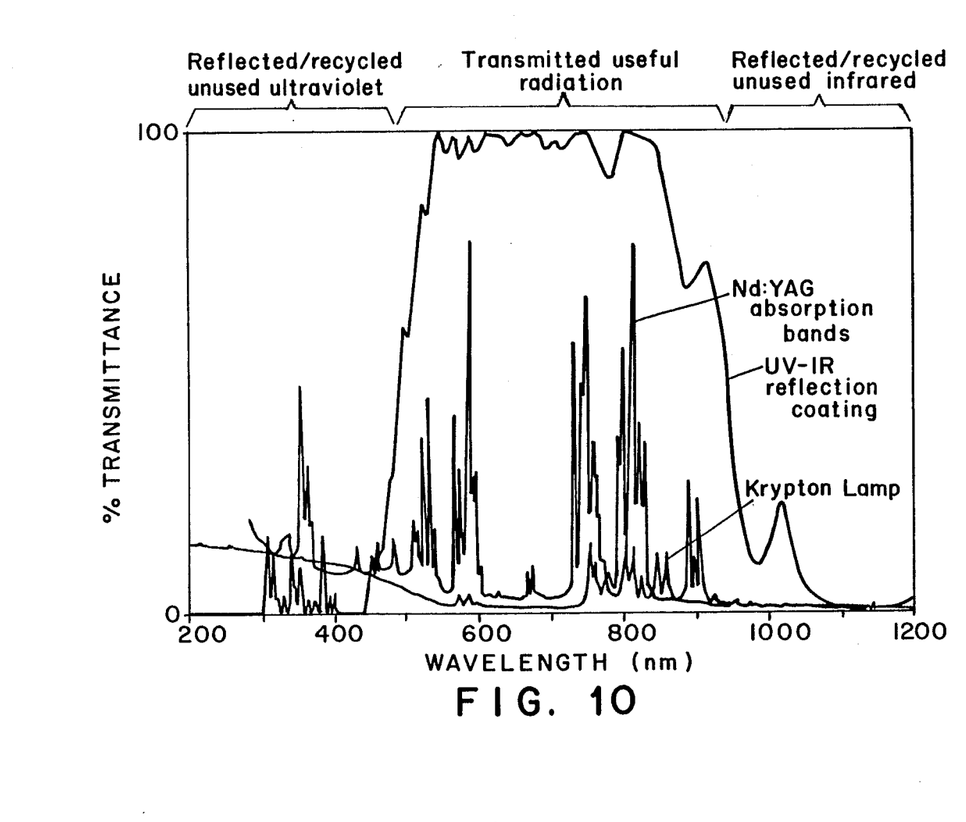
Figure 11A:
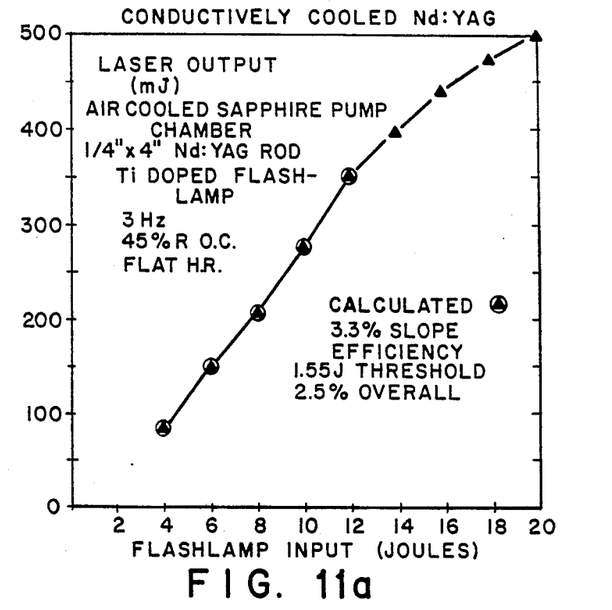
FIGS. 11a and 11b illustrate laser efficiency of a conductively cooled Nd:YAG laser in accordance with one aspect of the invention.
Figure 11B:
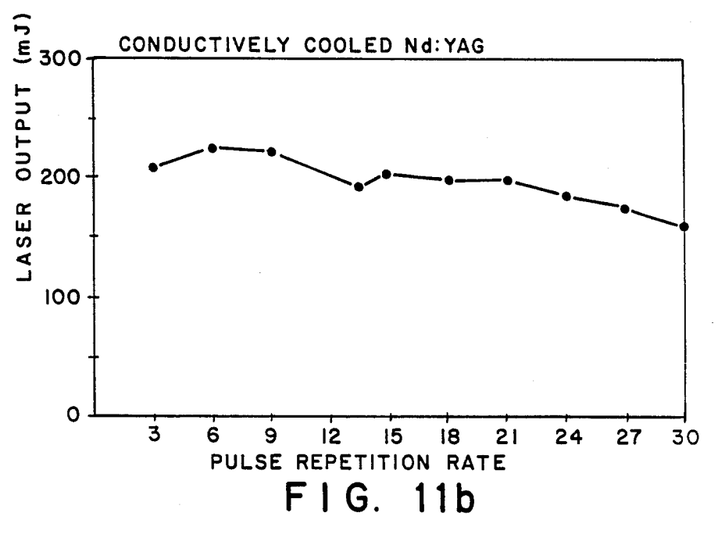

FIG. 9 shows how the output from a coated lamp correlates to alexandrite absorption bands, and is also compared to output from an uncoated lamp. FIG. 10 shows in a manner similar to FIG. 9 the correlation between coated and uncoated lamp output as compared to Nd:YAG absorption bands. In this case, the comparison is with both a coated as well as uncoated krypton lamp. Further, FIGS. 11a and 11b show laser efficiency of a conductively cooled Nd:YAG laser in accordance with the invention, shown operated with a doped, i.e., light filtering, envelope, which is only selectively absorptive to specific wavelengths and does not reflect back into the lamp.

A further test was conducted with alexandrite rods after having been solarized. The results for both coated and uncoated lamps are shown in FIG. 12.

Figure 2:
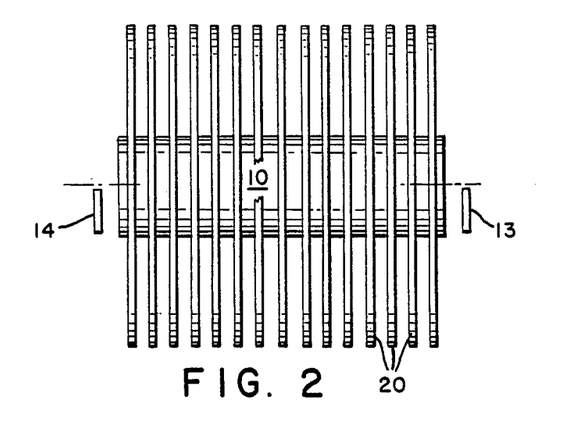
FIG. 2 is a side view of another embodiment of a laser of this invention.

FIG. 2 is a side view of an embodiment of the laser that includes radial cooling fins 20 that extend outward from housing 10.

Figure 3:
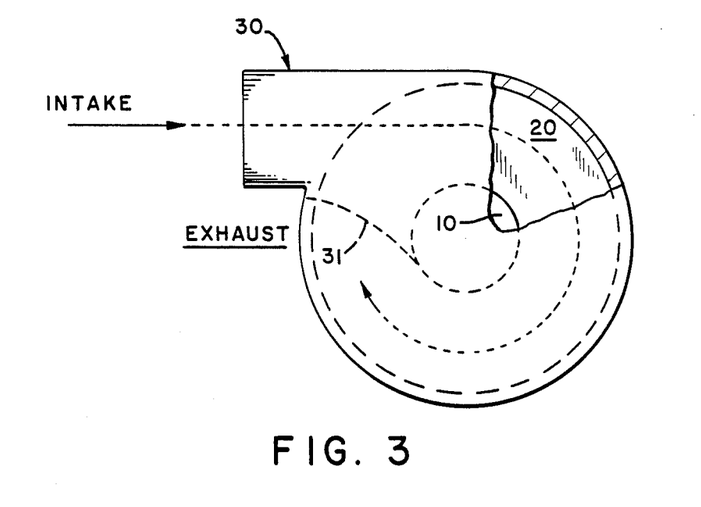
FIG. 3 is an end-view, partially cut away, of a cooled laser of this invention.

FIG. 3, in an end-on view, depicts an embodiment in which the cooling provided by fins 20 is augmented by a flow of coolant between the fins 20 and around the outside of housing 10. The coolant flow is directed through a shroud 30, which includes a baffle 31 that extends between the fins and deflects the coolant out of the shroud. Flowing a cooling fluid, such as air or water, over the outside of the housing places far fewer constraints on the system than does the conventional method of flowing fluid over the laser rod or lamp envelope. When fluid cools the laser rod or lamp directly, its optical properties are important, and it must be stable despite being subjected to higher temperatures and radiation levels. Extreme cleanliness is essential, and any residue from the fluid can have a strong detrimental effect on laser performance.

Figure 4:
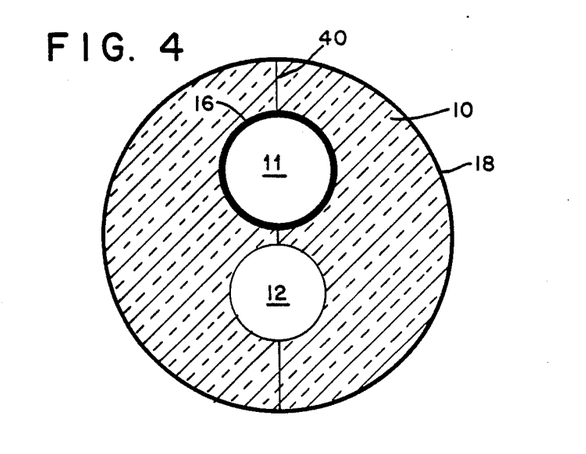
FIG. 4 is a cross-sectional view of the apparatus of FIG. 1.

FIG. 4 is a sectional view taken along the line 4—4 in FIG. 1. It shows circular cross sections for housing 10, pump lamp 11, and laser rod 12. Also shown are the filter coating 16 in accordance with that discussed above and reflective coating 18. In the embodiment shown, the housing comprises two semi-cylindrical sections joined at surface 40. Such a "clam shell" structure facilitates removal and replacement of the pump lamp and laser rod and reduces thermal stresses. Further, to accommodate for thermal expansion, the clam structure is preferably spring loaded.

Figure 5:
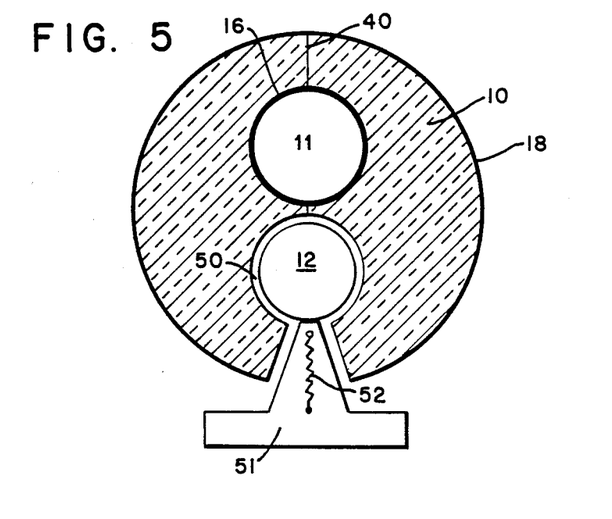
FIG. 5 is a cross-sectional view of another apparatus of the present invention.

FIG. 5 is a sectional view of another embodiment of the present invention. In that embodiment, the diameter of laser rod 12 is slightly smaller than that of its cavity in housing 10, leaving an annular gap 50. Thus, conductive heat flow between rod 12 and housing 10 is greatly reduced. The laser rod may be supported by support 51, which optionally may include a conventional heater 52. The configuration shown in FIG. 5, with heater 52, is particularly preferred when it is desired to operate the laser medium—alexandrite, for example—at an elevated temperature. The heater permits the user to bring the laser rod to an elevated temperature before lasing is begun, and gap 50 provides insulation to minimize the heat being conducted away by housing 10. Thus, an alexandrite laser having that structure can provide efficient (i.e., high-temperature) operation from the onset of lasing, especially with a filter coating on the flashlamp as discussed above.

During laser operation, the laser rod, pump lamp, and housing all heat up. Thus, laser media like alexandrite and emerald, whose output efficiency are not diminished at elevated temperatures, are preferred. On the other hand, as shown in FIGS. 11a and 11b, even Nd:YAG performance is high, equivalent to liquid cooled cavities, when this structure is employed, even with a doped envelop and no coating on the flashlamp. Of course, if a coated flashlamp is employed, even higher performance is expected. Unless there is a gap between the laser rod or lamp and the cavity that contains it, high temperature operation would cause excessive stresses to build up if the thermal expansion coefficient of the housing is substantially different from that of the laser rod or pump lamp envelope materials. Thus, for high power operation, it is preferred that the laser rod and lamp envelope have thermal expansion coefficients similar to that of the housing. The thermal expansion coefficient difference that can be tolerated depends on the temperature at which the element (lamp or laser rod) will operate, the clearance between the element and the cavity wall, and the strength of the element and housing. This selection can be made routinely by one of ordinary skill in this art.

An important criterion for the choice of lamp envelope and housing materials is that they transmit in the wavelength region of the laser pump bands. Typical of materials that are suitable are certain glasses, fused silica, quartz, chrysoberyl, and sapphire. Sapphire and fused silica are preferred envelope materials, especially sapphire, because they are suitable and are available commercially. Sapphire is a preferred housing material because of its superior thermal shock resistance. Further, sapphire has high optical transmission and high thermoconductivity. The relevant parameters that guide the choice of materials in a particular instance— e.g., transmission spectra, thermal conductivity, and thermal expansion coefficient—are tabulated in reference works such as the American Institute of Physics Handbook, published by McGraw-Hill.

If the laser is intended to have a long lifetime, then the need to replace lamps and laser rods dictates a clam shell structure and no bonding agent.

Having generally described the invention, the following examples are illustrative of its improved performance.

EXAMPLE I

What could one expect from a filtered flashlamp versus a coated flashlamp with a claim shell housing as described above?

An experiment was conducted on July 17, 1985 with a rod identified as rod #591. The rods are alexandrite rods.

|  |  | Laser output | |
| --- | --- | --- | --- |
| (a.) | Coated flashlamp 4 Hz PRR 64J input/pulse flashlamp 80% R/+4m HR resonator | 4.8W | 1.2 J/pulse |
| (b.) | Uncoated flashlamp initially, all other parameters constant | 3.7W | 0.925 J/pulse |
| (c.) | Uncoated flashlamp after 2,000 shots | 2.7W | 0.675 J/pulse |

If the blocking filter is less than 100% effective in stopping solarization, the best performance one could expect is shown in case (b.) where a 23% decrease was experienced from the coated flashlamp performance.

If the blocking filter is less than 100% effective, the performance would be as in case (c.) where a 44% decrease is observed.

Another deleterious effect the blocking filter may have is absorption of flashlamp radiation which is absorbed by the laser medium. This would result in an even further increase in the performance degradation observed with the uncoated flashlamp.

EXAMPLE II

A series of experiments were conducted with rods identified as #s 669 and 666 which display the enhancements provided by a filter coating on the flashlamp. The rods are alexandrite rods.

Experiment #1

| Uncoated Flashlamp, fixed 28.4J input | |
| --- | --- |
| Long pulse laser output initially | 0.085J |
| within 2,000 flashlamp shots | 0.063J |
| output drop because of solarization | Δ = 0.018 |

This represents a 21% decrease in performance

Experiment #2

Anneal laser rods, in all cases in an inert atmosphere such as N$_2$, of Experiment #1 to remove color centers caused by solarization

|  | Same Rod |
| --- | --- |
| (a) Rod #666 showed incomplete removal due to lower temperature annealing but had enhanced performance with a coated flashlamp | |
| Laser output with coated lamp | 0.125J solarized |
| Laser output with uncoated flashlamp | 0.085J unsolarized |
|  | Δ = 0.040 |
| This represents a 47% improvement from coated flashlamp with respect to the uncoated flashlamp. | |
| (b) Rod #669 annealed at a higher temperature to completely remove color centers. | |
| Laser output with coated flashlamp | 0.275J |
| Laser output with uncoated flashlamp | 0.085J unsolarized |

| | Same Rod |
|---|---|
| | $\Delta = 0.190$ |

This represents a 224% improvement with coated flashlamp with respect to an uncoated flashlamp and an unsolarized laser rod.

We claim:

1. A unitary laser comprising:
   (a) a transparent, thermally-conductive solid housing comprising two semicylindrical sections joined at one surface to be movable between a first open position and a second closed position;
   (b) a laser medium that has two opposite ends and is embedded in a first cavity in said housing which is defined by said housing when in said second closed position;
   (c) a pump lamp for exciting the laser medium, said pump lamp embedded in second cavity in said housing which is defined by said housing when in said second closed position; and
   (d) reflectors adjacent to the opposite ends of the laser medium that define an optical resonant cavity and support coherent radiation emitted by the laser medium, whereby as result of the structure of the unitary laser, the laser rod and pump lamp, which are held in said housing when in said second closed position, can be easily removed for cleaning and replacement.

2. The laser of claim 1 in which the housing comprises sapphire.

3. The lower of claim 1 further comprising a reflective coating on the exterior surface of the housing.

4. The laser of claim 1 further comprising means for cooling the exterior of the housing.

5. The laser of claim 1 further comprising a support means for the laser medium.

6. The laser of claim 1 in which the housing comprises one of sapphire and fused silica.

7. The laser of claim 1 further comprising heating means for the laser medium and a gap between the laser medium and the housing.

* * * * *